United States Patent [19]

Suzuki

[11] Patent Number: 5,593,608
[45] Date of Patent: Jan. 14, 1997

[54] TEMPERATURE CONTROL METHOD AND APPARATUS FOR USE IN THERMAL PROCESSING EQUIPMENT

[75] Inventor: Fujio Suzuki, Kanagawa-ken, Japan

[73] Assignees: Tokyo Electron Limited, Tokyo; Tokyo Electron Tohoku Limited, Esashi, both of Japan

[21] Appl. No.: 303,747

[22] Filed: Sep. 9, 1994

[30] Foreign Application Priority Data

Sep. 9, 1993 [JP] Japan .................................. 5-249920
Sep. 9, 1993 [JP] Japan .................................. 5-249921
Sep. 9, 1993 [JP] Japan .................................. 5-249922

[51] Int. Cl.$^6$ ...................................................... H05B 1/02
[52] U.S. Cl. ........................ 219/492; 219/494; 219/497; 219/486; 373/102; 432/120
[58] Field of Search .................................... 219/481, 486, 219/488, 501, 497, 499, 506, 494; 373/1, 102, 107; 432/120, 128

[56] References Cited

U.S. PATENT DOCUMENTS

| | | | |
|---|---|---|---|
| 4,467,182 | 8/1984 | Merkel | 219/497 |
| 4,952,227 | 8/1990 | Herrington et al. | 65/162 |
| 5,026,971 | 6/1991 | Payne et al. | 219/483 |
| 5,120,936 | 6/1992 | Shyu et al. | 219/499 |
| 5,125,068 | 6/1992 | McNair et al. | 392/441 |

FOREIGN PATENT DOCUMENTS

| | | |
|---|---|---|
| 55-24126 | 6/1980 | Japan . |
| 60-44792 | 10/1985 | Japan . |
| 62-160512 | 7/1987 | Japan . |

*Primary Examiner*—Mark H. Paschall
*Attorney, Agent, or Firm*—Oblon, Spivak, McClelland, Maier & Neustadt, P.C.

[57] ABSTRACT

A method for controlling temperature in thermal processing equipment having a processing chamber containing members to be processed. The method comprises the steps of heating a plurality of zones of the processing chamber by heaters provided in the zones, respectively, measuring periods of time which elapse until temperatures in the zones increase from a predetermined value to at least one reference value, obtaining time differences among the periods measured, and storing the time differences into a memory, and adjusting timings of heating the zones by the heater, thereby to reduce the time differences.

22 Claims, 8 Drawing Sheets

| ZONE \ REFERENCE TEMPERATURE | 500°C | 750°C | 1000°C | 1200°C |
|---|---|---|---|---|
| Z1 | 0 | 2' 30" | 4' 50" | 6' 47" |
| Z2 | 0 | 2' 42" | 5' 01" | 6' 52" |
| Z3 | 0 | 2' 50" | 5' 08" | 7' 03" |
| ⋮ | | ⋮ | | |
| Zi | 0 | x | y | z |

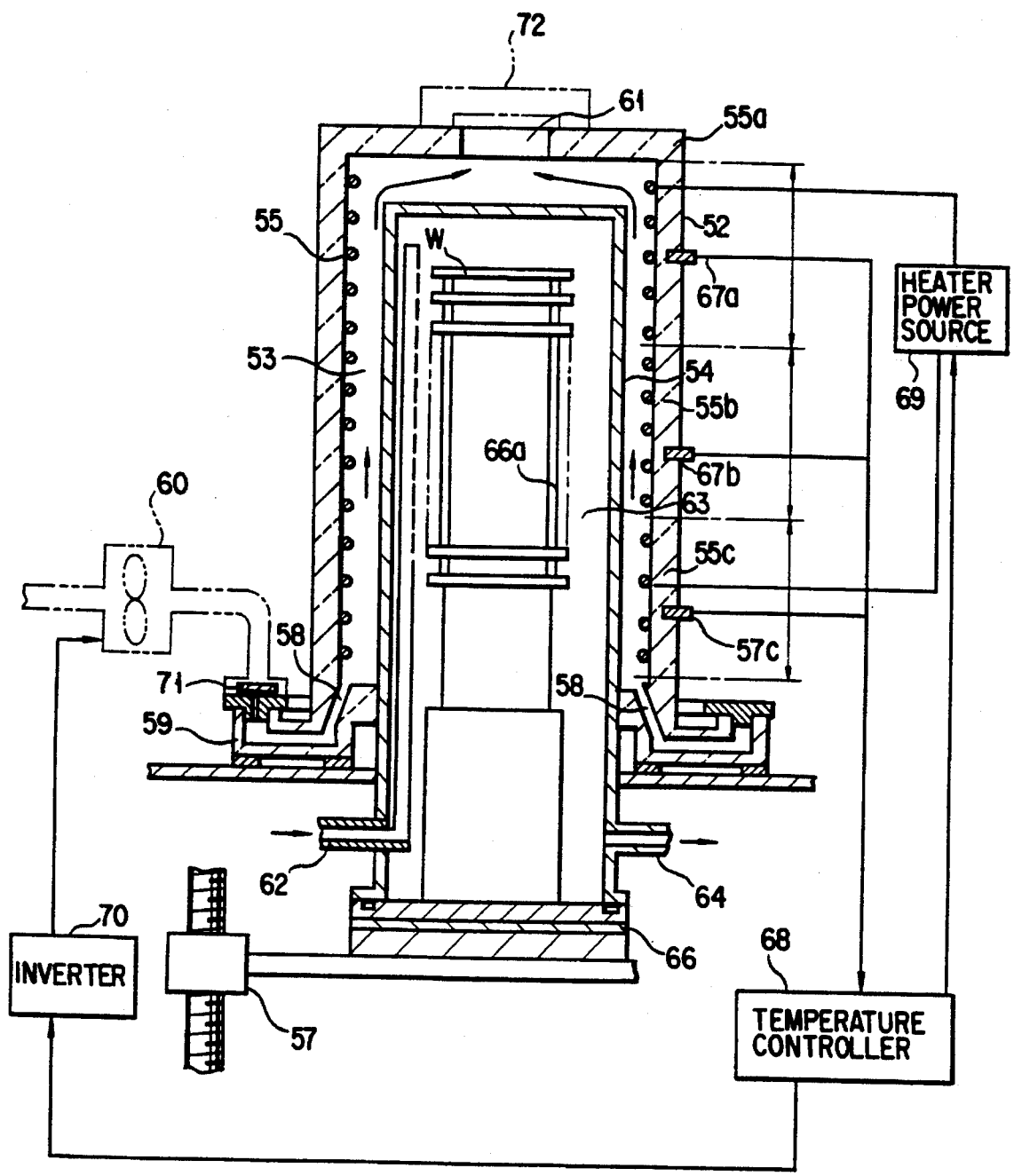
F I G. 6

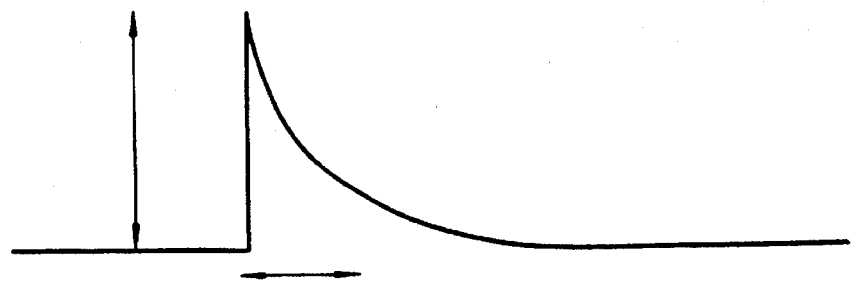
F I G. 7
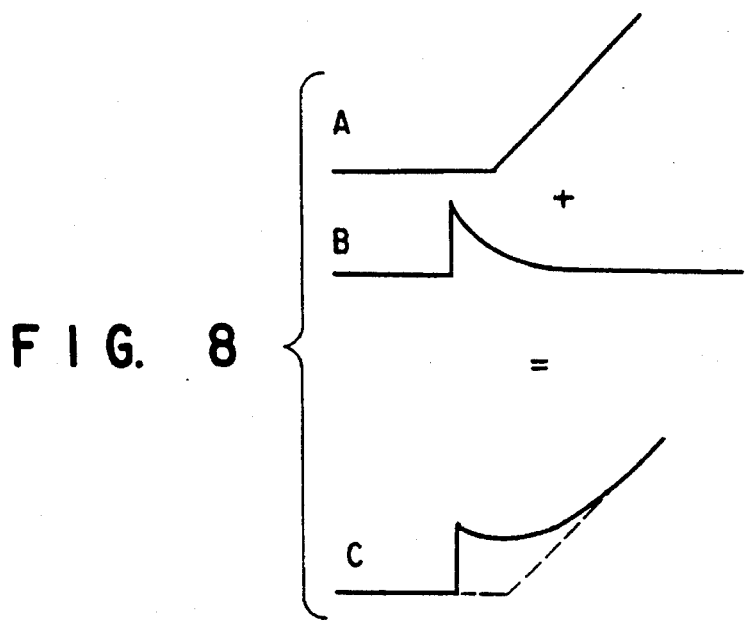
F I G. 8
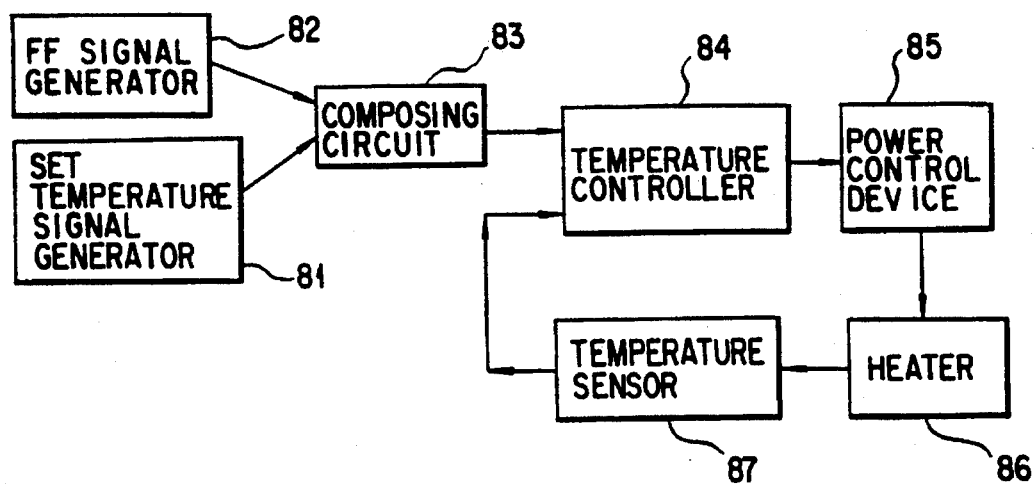
F I G. 9

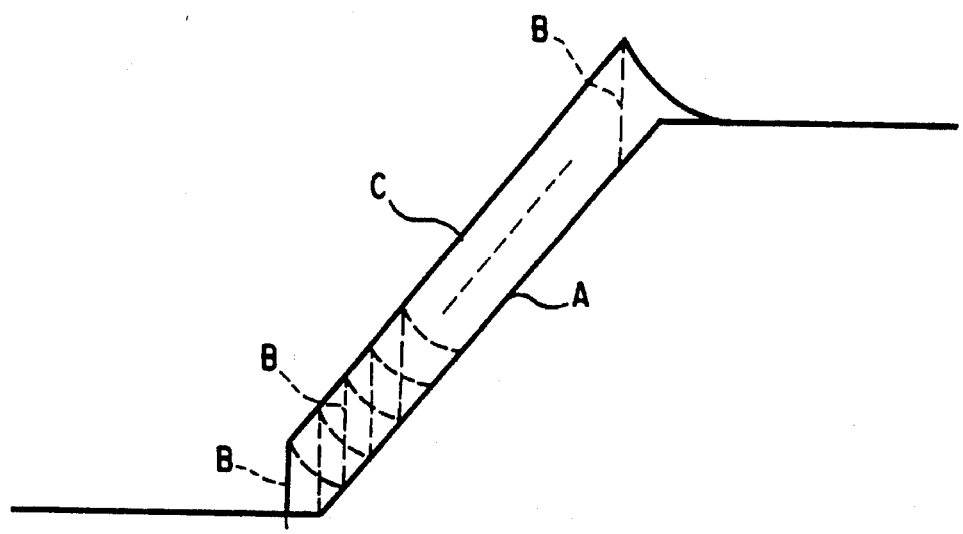
F I G. 10
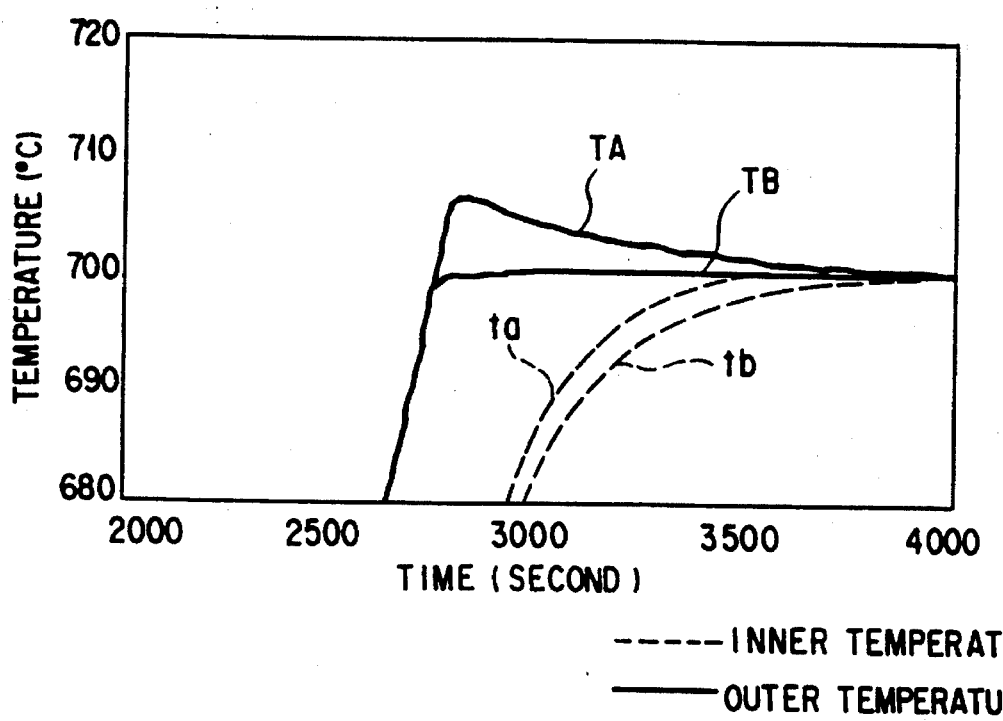
F I G. 11

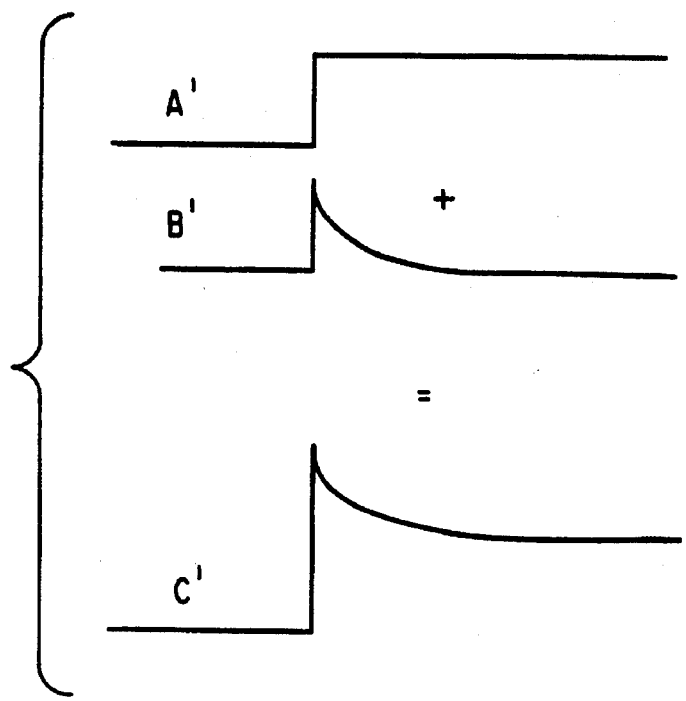
F I G. 12
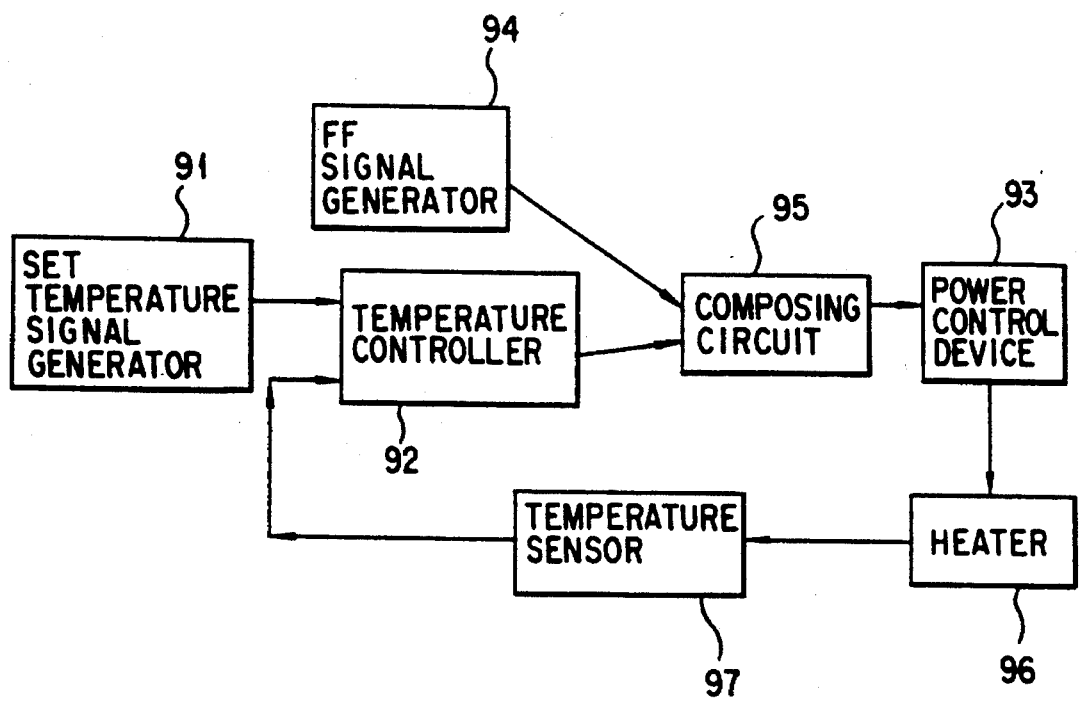
F I G. 13

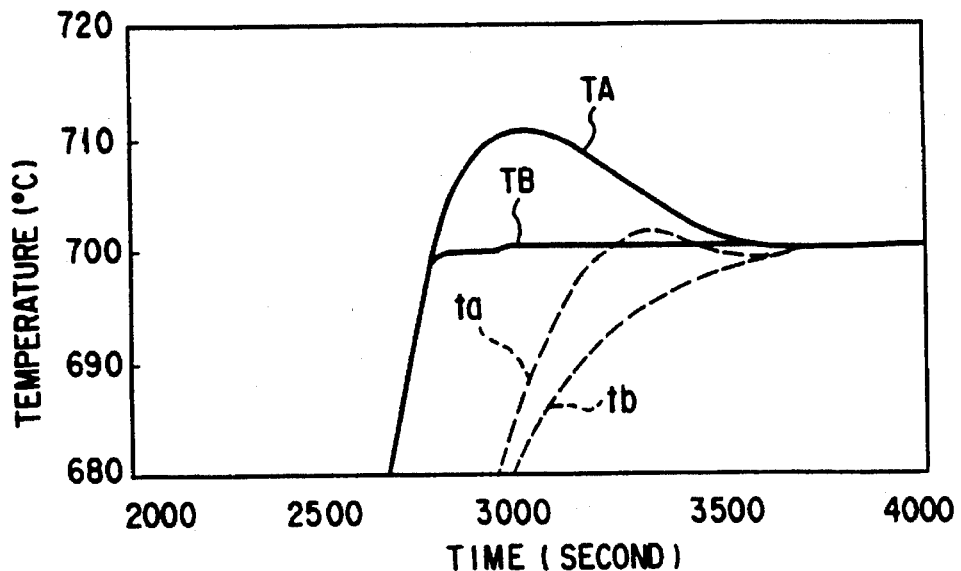
F I G. 14
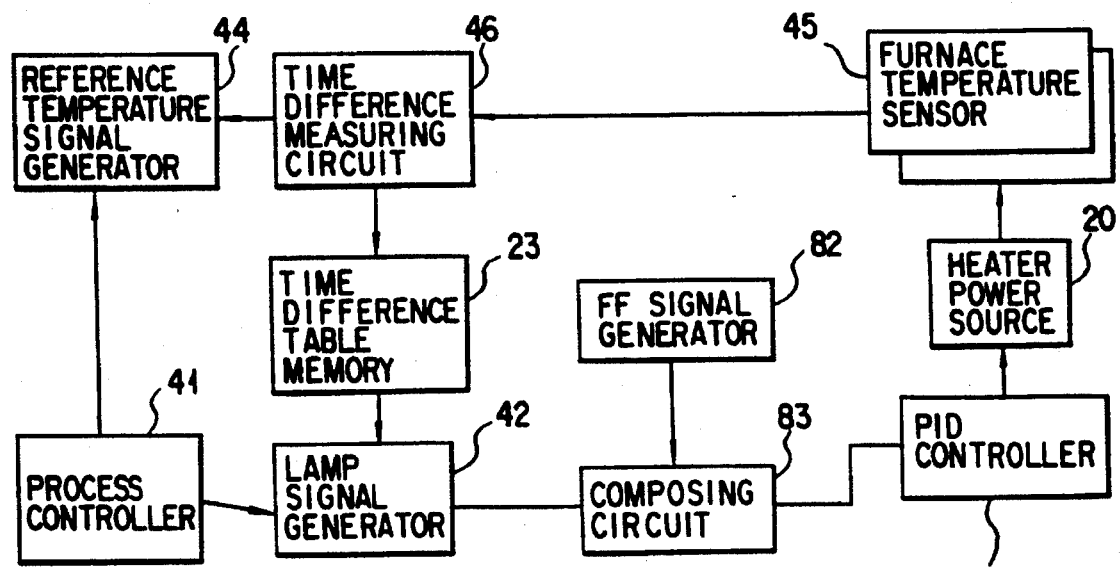
F I G. 15

TEMPERATURE CONTROL METHOD AND APPARATUS FOR USE IN THERMAL PROCESSING EQUIPMENT

BACKGROUND OF THE INVENTION

1. Field of the Invention

The present invention relates to thermal processing equipment, and more particularly to a method and apparatus for achieving feed-forward temperature control in thermal processing equipment.

2. Description of the Related Art

Various apparatuses have been used to manufacture semiconductor devices, for depositing a thin film on a semiconductor wafer, forming an oxide film on the wafer and diffusing impurities into the wafer. Among them are a CVD (Chemical Vapor Deposition) apparatus, an oxide film forming apparatus and a diffusion apparatus. Recently, a vertical thermal processing furnace is used in these apparatuses, in order to perform high-precision process on semiconductor wafers. Most thermal processing furnaces of this type comprise a tubular furnace, a reactor and an elevator. The furnace extends vertically. The reactor is made of silica or the like, is located in the tubular furnace and defines a processing chamber. The elevator transports a wafer boat into and from the processing chamber. Many members to be processed, such as semiconductor wafers, are contained in the wafer boat. They are positioned horizontally and one above another. When the wafer boat is lifted into the reactor by the elevator, the members are brought into the chamber. A reactive gas is introduced into the chamber, whereby thermal process such as oxide film forming, is performed on the members.

To manufacture integrated circuits which operate at high speed and which has high integration density, the process at the surface of a semiconductor wafer must be controlled with high precision. To this end, it is necessary to increase the precision of thermal process. Particularly, the temperature needs to be increased and decreased uniformly in the processing chamber.

However, it is difficult to increase and decrease the temperature uniformly in the processing chamber. This is because the parts of the reactor has different thermal loss characteristics. Heat accumulates in the top of the reactor and leaks at the manifold connected to the bottom of the reactor. As a result, the temperature is higher in the upper part of the reactor than in the lower part thereof. Temperature cannot be distributed uniformly in the chamber even if the output of the heater provided outside the chamber is kept constant.

A method of uniformly distributing temperature in the processing chamber has recently been developed. In this method, a plurality of heaters are located in the heating zones of the chamber and independently controlled to equalize the temperatures in the heating zones.

However, even if the heaters are controlled at the same time, it remains difficult to increase or decrease the temperatures in the heading zones to the same value thereby to heating or cooling the members to be processed (e.g., semiconductor wafers) which are located in the heating zones. This is because the heating zones have different thermal transfer characteristics. In order to change the temperatures in the heating zones to the same value, a plurality of temperature controllers are used, each for one heater, different temperature control values (known as "ramping values") need to be set in the temperature controllers. Much time and skill are required to set different ramping values in the respective controllers, however. This is a practical problem. In the case where only one temperature controller is used, and different ramping values can not be set in the heating zones, respectively, it is impossible to uniformly distributing temperature in the processing chamber.

To accomplish successful thermal process on, for example, semiconductor wafers, it is necessary to heat the wafers from a low temperature (e.g., 500° C.) to a predetermined temperature (e.g., 1000° C.) within a short time, to maintain the wafers at the predetermined temperature (e.g., 1000° C. ) during the thermal process, and to cool the wafers to the low temperature (e.g., 500° C.) within a short time after the thermal process.

In the conventional vertical thermal processing furnace, the members to be processed are heated by the heater provided outside the chamber. Heat is transmitted from the heater is indirectly transmitted to the members. More precisely, the heat is transmitted to the members through the silica walls of the chamber or through means for uniformly transmitting heat. Some time elapses until the heat reaches the interior of the processing chamber. The temperature control effected by only the temperature detector located near the heater outside the chamber is inevitably delayed. Consequently, the temperature in the chamber cannot be controlled with accuracy and at high speed. This causes a problem. Once the temperature in the chamber has fallen due to the insertion of the wafer boat into the chamber, its recovery requires much time since the temperature control is delayed in the conventional method.

To shorten the temperature-recovery time, a temperature control system has been developed. The system has a temperature detector positioned in the processing chamber. Based on the temperature detected by the detector is applied to control the temperature in the chamber. In this system, however, a film is formed on the temperature detector during the thermal process, since the temperature detector is located within the chamber. Once covered with a film, the temperature detector can no longer accurately detect the temperature in the chamber, making it impossible to control the temperature with sufficient accuracy.

More recently, a temperature control method has been developed in which the temperature in the processing chamber is controlled based on only the temperature provided outside the chamber in accordance with the temperature control recipe prepared by interpolation on the basis of a look-up table. This method has a problem, however. Many parameters need to be input, and much skill is required, to prepare the temperature control recipe.

SUMMARY OF THE INVENTION

An object of the present invention to provide a novel and improved temperature control method for use in a thermal processing equipment, in which a temperature controller controls a plurality of heating members, thereby to uniformly distribute temperature in the processing chamber of the equipment, so that the members contained in the chamber may be heated to the same temperature.

Another object of the invention is to provide a novel and improved feed-forward temperature control method for use in a thermal processing equipment, in which a temperature control recipe is corrected by a correction signal generated by a very simple method, thereby to control the temperature in the processing chamber of the equipment accurately and fast by using temperature detecting means located outside the chamber, without using any temperature detecting means provided inside the chamber.

According to a first aspect of this invention, there is provided a method for controlling temperature in thermal processing equipment, which comprises the steps of: heating a plurality of zones of a processing chamber by heating members provided on the processing chamber which contains members to be processed; measuring periods of time which elapse until temperatures in the zones increase from a predetermined value to at least one reference value, obtaining time differences among the periods measured, and storing the time differences in memory means; and adjusting timings of heating the zones by the heating members, respectively, so as to reduce the time differences.

According to a second aspect of the present invention, there is provided a method for controlling temperature in thermal processing equipment, which comprises the steps of: generating a set temperature signal for driving heating members provided on the processing chamber containing members to be processed, such that the heating members increase the temperature in the processing chamber to a predetermined set value; generating a feed-forward signal for compensating for a delay of thermal transfer from exterior of the processing chamber to interior thereof; combining the set temperature signal and the feed-forward signal, thereby generating a composite signal; and causing the heating members to heat the processing chamber in accordance with the composite signal, thereby to compensate for the delay of thermal transfer.

In the method according to the first aspect of the invention, the heating members are driven at the same time to increase or decrease the zones of the processing chamber. The period of time required to raise the temperature in each zone from a predetermined value of, for example, 500° C. to a reference value of, for example 800° C. is measured. Then, the difference is obtained between the time required to raise the temperature in any zone in which temperature increases most slowly and the time required to raise the temperature in each of the other zones. The time differences, thus obtained, are stored into the memory incorporated in a temperature controller. The timings of heating the zones are adjusted so that the temperatures in all zones may reach a desired value at the same time, canceling the time differences stored in the memory. The temperature controller supplies data representing the time differences to a process controller. Based on this data the process controller give a temperature-increasing or -decreasing command to the temperature controller. In accordance with the command the temperature controller drives a plurality of heating members, whereby the temperature is uniformly distributed in the thermal processing chamber despite the different thermal loss characteristics of the zones.

The periods of time which elapse until the temperatures in the zones increase to reference value obtained by experiment or simulation and already input to the process controller are measured, thereby obtaining time differences among the periods measured. The heating members are driven so as to cancel out the time differences. As a result, the temperature is uniformly distributed in the thermal processing chamber despite the different thermal loss characteristics of the zones.

In the temperature control method according to the second aspect of the invention, the set temperature signal and the feed-forward signal are combined into a composite signal, by which the delay between the time when the temperature outside the chamber reaches the set value and the time when the temperature in the chamber reaches the set value is compensated. When the temperature in the chamber is increased in accordance with the composite signal, the response of temperature control is enhanced. As far as the inventors thereof know, the temperature transfer function in the chamber and the temperature transfer function outside the chamber can be approximated to each other in a primary delay system. Hence, if the following exponential function f(t) is added to the set temperature signal, the delay of the temperature transmission from the outside of the chamber to the inside thereof is compensated easily and quickly:

$$f(t)=Es\ \exp(-t/T)$$

where E is the maximum temperature fluctuation and T is the time constant. More specifically, when the outer temperature is increased above a composite temperature of the set value and the correction temperature, i.e., the feed-forward temperature, the response of the inner temperature control is improved. In this case, many parameters are not required as in the conventional temperature control method. It suffices to input the maximum temperature fluctuation E and the time constant T, both obtained by simulation, to the temperature controller. The temperature in the processing chamber can be controlled easily and fast, merely by monitoring the temperatures detected by the temperature sensors located outside the reactor tube, without inside temperature sensors. The temperature control method can therefore serves to perform micro-process on the surface of a material to be processed, and also to enhance the controllability of a thermal processing equipment, thereby to increase yield of products and the throughput of the equipment.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 6 is a sectional view schematically showing a vertical thermal processing furnace to which the temperature control method according to a second embodiment of the present invention can be applied;

FIG. 7 is diagram representing the waveform of a feedforward (FF) signal used in the temperature control method according to the second embodiment;

FIG. 8 is a diagram explaining how to combine a set temperature signal and an FF signal, thereby generating into a composite temperature signal;

FIG. 9 is a block diagram showing a temperature control system which performs the temperature control method according to the second embodiment of this invention;

FIG. 10 is a diagram illustrating a composite signal generated by the temperature control method according to the second embodiment;

FIG. 11 is a graph showing the results of the temperature control method according to the second embodiment and those of a conventional temperature control method;

FIG. 12 is a diagram explaining a composite manipulated variance obtained by combining an FF signal and a controller control variable used in a temperature control method according to a third embodiment of the invention;

FIG. 13 is a block diagram of the temperature control system for performing the temperature control method according to the third embodiment;

FIG. 14 is a graph showing the results of the temperature control method according to the third embodiment and those of a conventional temperature control method; and FIG. 15 is illustrating a temperature control system for performing the temperature control method according to a fourth embodiment of the present invention.

DETAILED DESCRIPTION OF THE PREFERRED EMBODIMENTS

With reference to the accompanying drawings, a temperature control method according to the first embodiment of the invention will be described, which is applied to a vertical, high-speed thermal processing furnace designed to process semiconductor wafers.

Figure 1:
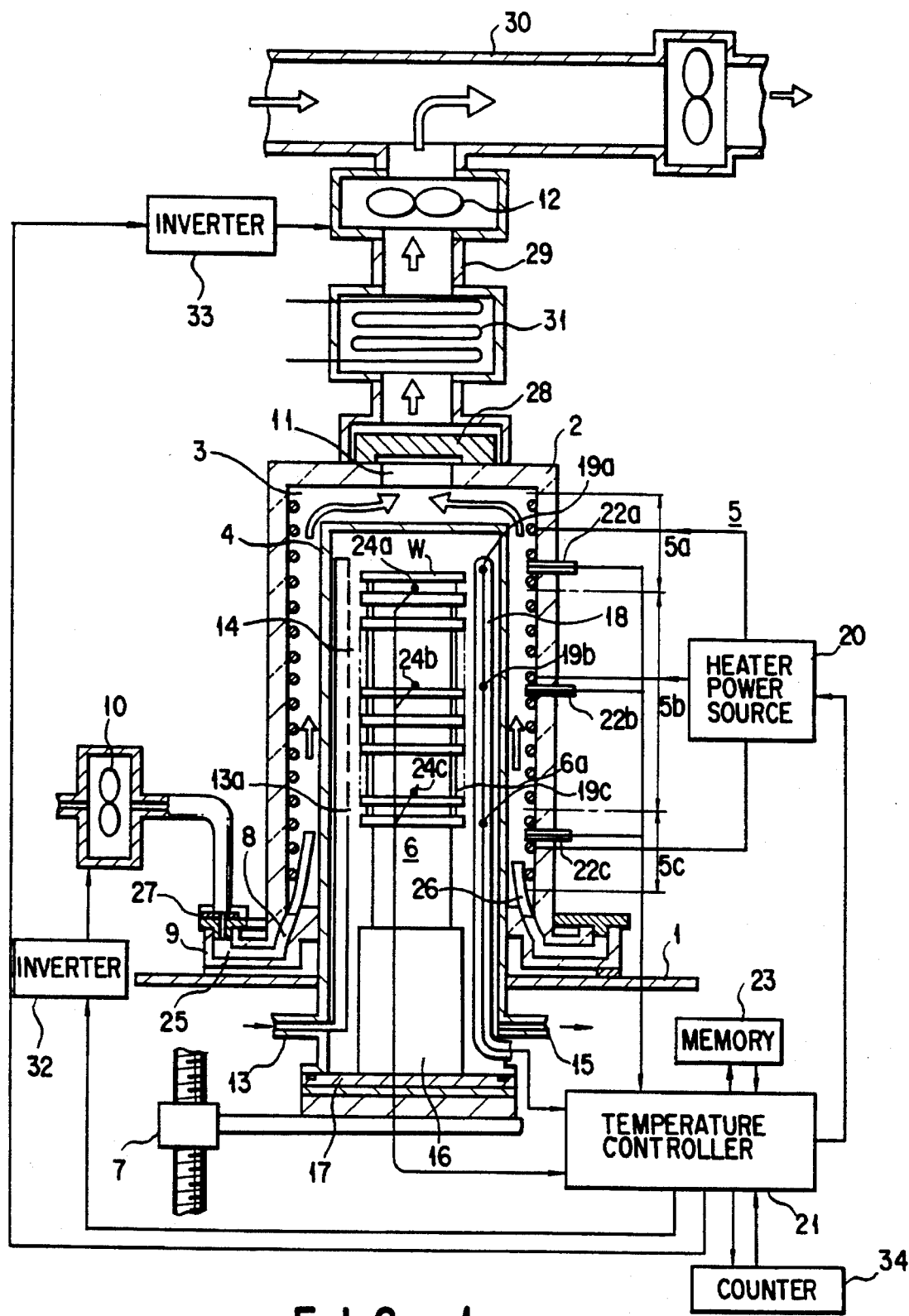
FIG. 1 is a sectional view of a vertical, high-speed thermal processing furnace to which the temperature control method according to a first embodiment of the invention can be applied.

As shown in FIG. 1, the vertical thermal processing furnace comprises a base 1, a tubular furnace 2, a reactor tube 4, a heater 5, a wafer boat 6, and an elevator mechanism 7. The base 1 is fixed horizontally. The furnace 2, which has a thermally insulated top, is mounted on the base 1 and extends vertically. The reactor tube 4 is located in the tubular furnace 2, with an annular space 3 provided between it and the inner circumferential surface of the furnace 2. The reactor tube 4 has a top made of, for example, silica. The heater 5 is, for example, a helical, resistive heat-generating member which is mounted on the inner circumferential surface of the furnace 2. The wafer boat 6 is made of, for example, silica; it can support a number of semiconductor wafers W, horizontally positioned and arranged one above another. The elevator mechanism 7 is used to move the wafer boat 6 up and down in the reactor tube 4.

At the bottom of the tubular furnace 2 there are provided air inlets 8 which communicates with the annular space 3. The ports 8 are connected to a manifold 9, which in turn is connected to an air-supply fan 10. When the fan 10 is driven, cooling air is supplied into the annular space 3 through the manifold 9 and the air inlets 8. The top of the furnace 2 has an exhaust outlet 11 which communicates with the annular space 3. An exhaust fan 12 is located at the exhaust outlet 11, for forcing the air from the annular space 3.

In the reactor tube 4, a reactive gas supply pipe 13 extends upwards from the bottom of the reactor tube 4. The pipe 13 is connected at its lower end to a gas source by a flow control device (not shown). The upper part of the pipe 13 has gas-inlet holes 13a properly spaced apart along the axis of the reactive gas supply pipe 13. A specific reactive gas can be supplied through these holes 13a and uniformly distributed into the processing chamber 14 which is defined by the reactor tube 4. An exhaust pipe 15 is connected at one end to the bottom of the reactor tube 4 and at the other end to a vacuum pump (not shown). The chamber 14 can therefore be evacuated to a prescribed pressure, and the reactive gas can be drawn out of the chamber 14.

The wafer boat 6 has wafer-holding members 6a, a heat insulating mold 16 located below the members 6a, and a cover 17 connected to the lower end of the mold 16. When the wafer boat 6 is moved upwards by the elevator mechanism 7, the cover 17 closes the lower end of the reactor tube 4 in airtight fashion. Once the cover 17 has closed the lower end of the reactor tube 4, the processing chamber 14 can be evacuated by using the exhaust pipe 15 and the vacuum pump in preparation for thermal process. As the chamber 14 is thus evacuated, the reactive gas is introduced into the chamber 14 through the gas-inlet holes 13a made in the upper part of the pipe 13.

The temperature control system of the vertical thermal processing furnace will be described. The system comprises an upper heater 5a, a central heater 5b, a lower heater 5c, an inside upper thermocouple 19a, an inside central thermocouple 19b, an inside lower thermocouple 19c, and a temperature controller 21. The heaters 5a, 5b and 5c constitute the heater 5, e.g. a helical, resistive heat-generating member. The thermocouples 19a, 19b and 19c are inserted in a silica tube 18 extending vertically in the reactor tube 4, for detecting temperatures at three positions near the semiconductor wafers W supported by the wafer boat 6. The thermocouples 19a, 19b and 19c generate temperature signals representing the temperatures they have detected. The temperature signals are supplied to the temperature controller 21. In accordance with the temperature signals, the controller 21 generates drive signals to the heaters 5a, 5b and 5c, which is supplied to a heater power source 20. Driven by these signals, the heater power source 20 supplies power to the heaters 5a, 5b and 5c, thereby to distribute temperature uniformly in the processing chamber 14.

The temperature control system further comprises outside thermocouples 22a, 22b and 22c arranged outside the processing chamber 14 and near the heaters 5a, 5b and 5c, respectively. These thermocouples 22a, 22b and 22c detect the temperatures of the heaters 5a, 5b and 5c and generate temperature signals representing the temperatures they have detected. These temperature signals are supplied to the temperature controller 21. In accordance with these signals, the controller 21 generates drive signals to the heaters 5a, 5b and 5c, which are supplied to a heater power source 20. Driven by these signals, the heater power source 20 supplies power to the heaters 5a, 5b and 5c, thereby to control the heaters 5a, 5b and 5c.

The temperature controller 21 has a microcomputer and is connected to the a counter 34 and a time difference table memory 23. The memory 23 stores temperature data, in the form of a time function table or a time difference table, which has been acquired prior to the actual use of the vertical thermal processing furnace and which represents the temperatures TW1, TW2 and TW3 of three dummy wafers DWa, DWb and DWc located at near the thermocouples 19a, 19b and 19c, the temperatures TH1, TH2 and TH3 detected by the outer thermocouples 22a, 22b and 22c and the temperatures T11, T12 and T13 detected by the inside thermocouples 19a, 19b and 19c. The microcomputer is programmed so as to process the temperature data as will be described later, and generates a feed-forward control signal. The control signal controls the heater power source 20.

The temperatures TW1, TW2 and TW3 of the dummy wafers DWa, DWb and DWc are detected by thermocouples 24a, 24b and 24c connected to the dummy wafers DWa, DWb and DWc. The outputs of the thermocouples 24a, 24b and 24c are connected to the temperature controller 21, so that the signals representing the temperatures TW1, TW2 and TW3 can be input to the controller 21. Once the temperature data has been thus acquired, the dummy wafers DW1, DW2 and DW3 and the thermocouples 24a, 24b and 24c are removed from the tubular furnace 2 before thermal process is performed on the semiconductor wafers W in the processing chamber 14.

The vertical thermal processing furnace has a forced-air cooling device, which will be described below.

The air inlets 8, for example eight air inlets, are located at equal intervals in an annular space 25 surrounding the bottom of the tubular furnace 2. Connected to the air inlets 8 are nozzles 26 which project into the annular space 3. Cooling air can flow from the air-supply fan 10 into the annular space 3 through a shutter 27, the manifold 9 and the nozzles 26, and can thereby uniformly distributed in the annular space 3. The exhaust outlet 11 is connected by a shutter 28 and a duct 29 to an exhaust duct 30 of the type installed in factories. A heat exchanger 31 and an exhaust fan 12 are provided on the duct 29. The heat exchanger 31 is used to receive the exhaust air heated while circulating in the furnace 2 and cool it to room temperature. The exhaust fan 12 is provided to draw the cooled exhaust air smoothly into the duct 30. An inverter 33 is connected to the exhaust fan 12, and an inverter 32 to the air-supply fan 10. The inverters 33 and 32 controls the rotational speeds of the fans 10 and 12, respectively, in accordance with the commands supplied from the temperature controller 21.

With reference to FIGS. 2 to 5 it will now be explained how the high-speed thermal processing furnace described above performs the temperature control method according to the first embodiment of the invention.

Figures 4, 5:
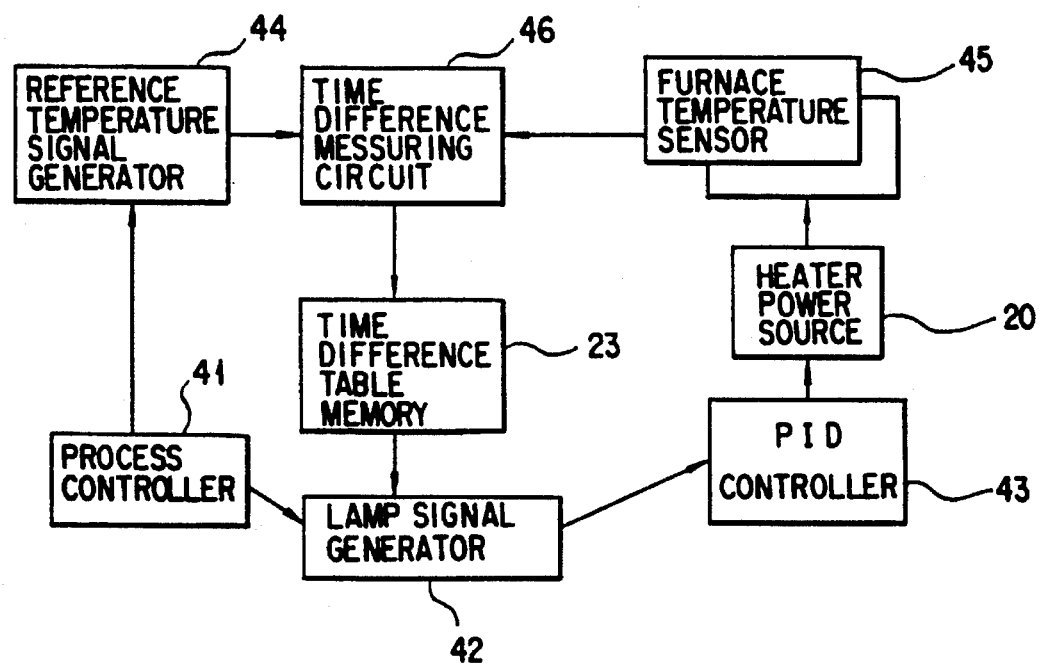
FIG. 4 is a block diagram explaining a temperature control system which performs the temperature control method according to the first embodiment of the present invention.
FIG. 5 illustrates a time difference table which is applicable to the temperature control method explained in FIG. 4.

In the first embodiment, it is necessary to acquire temperature data before starting the temperature control. For this purpose, the temperature data are corrected and a feed-forward control signal required for a successful temperature control is extracted from the temperature data. To acquire the temperature data, as shown in FIG. 4, a process controller 41 supplies a ramp signal generator 42 with a signal representing the temperature best possible for the thermal process, and sets a reference temperature in a reference temperature signal generator 44. The ramp signal generator 42 generates from the input signal a ramp signal for driving the heater 5, which is supplied to a PID controller 43. The reference temperature may be, for example, 750° C. Alternatively, as shown in FIG. 5, two or more reference temperatures, for example, 500° C., 750°, 1000° C., and 1200° C., may be set in the reference temperature signal generator 44.

Although the process controller 41, the ramp signal generator 42 and the PID controller 43 are illustrated as if they are discrete components, they form the temperature controller 21 (FIG. 1) as a single unit by being integrated or combined. The PID controller 43 is connected to the heater power source 20, for controlling the heaters 5a, 5b and 5c provided in the tubular furnace 2.

In data acquisition mode, the shutter 27 is closed, thereby closing the air inlets 8, and the shutter 28 is closed, thereby closing the exhaust outlet 11. Three dummy wafers DWa, DWb and DWc are held in the upper, central and lower portions of the wafer boat 6, respectively. The elevator mechanism 7 is driven, moving the wafer boat 6 upwards in the reactor tube 4, until the dummy wafers DWa, DWb and DWc are horizontally aligned with the heaters 5a, 5b and 5c. At this time, the temperature in the reactor tube 4 has been increased to, for example, 500° . Next, the electric powers supplied to the heaters 5a, 5b and 5c are simultaneously increased. The temperature in the furnace 2 is raised, while the counter 34 is measuring time. At the same time, a furnace temperature sensor 45 starts measuring temperatures. The sensor 45 comprises the inside thermocouples 19a, 19b and 19c, the outside thermocouples 22a, 22b and 22c, and the thermocouples 24a, 24b and 24c connected to the dummy wafers DWa, DWb and DWc.

Figure 2:
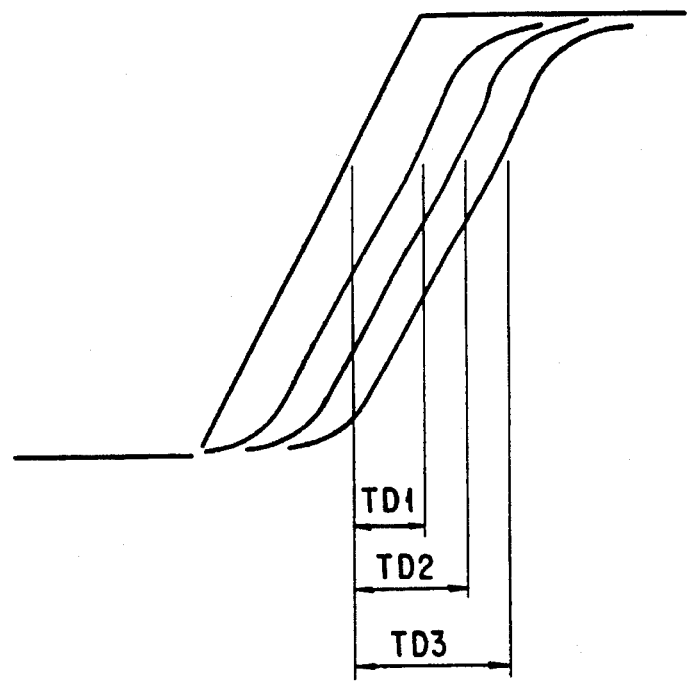
FIG. 2 is a graph representing the difference in temperature-increasing time among the heating zones of the thermal processing furnace.

If the heaters 5a, 5b and 5c are driven at the same time with the same electric power, the temperatures detected by the outside thermocouples 22a, 22b and 22c located at the heaters 5a, 5b and 5c will increase at the same rate, and there will be no difference in temperature among the heating zones in the reactor tube 4. As a matter of fact, the temperatures in the heating zones increase from the set temperature at different rates as is illustrated in FIG. 2. This is inevitably because the heat passages from the heaters 5a, 5b and 5c to the interior of the reactor tube 4 have different thermal transfer characteristics and the heating zones have different thermal loss characteristics.

In the present embodiment, the differences in temperature among the heating zones in the reactor tube 4 are measured as time differences TD1, TD2 and TD3 which are detected by a time difference measuring circuit 46 and which are periods of time which elapse until the temperatures detected by the inside thermocouples 19a, 19b and 19c increase from the reference value of 500° C. to 750°, 1000° and 1200° C. The time differences TD1, TD2 and TD3 which the circuit 46 measures are stored in time difference table the memory 23, in the form of a time difference table shown in FIG. 5.

After acquiring the time differences TD1, TD2 and TD3 by keep detecting the temperatures of each dummy wafers until it reaches from 500° C. to the predetermined values, the forced-air cooling device is driven, either turning off the heater power source 20 or reducing the powers supplied to the heaters 5a, 5b and 5c, until the temperatures of the dummy wafers DWa, DWb and DWc fall to, for example, 500°. Then, the elevator mechanism 7 is driven to move the wafer boat 6 downwards in the reactor tube 4, and the dummy wafers DWa, DWb and DWc are removed from the tubular furnace 2. Preferably, the time differences, which are made while the temperature in the chamber 14 is decreasing, are stored at this time into the memory 23 in the form of the time difference table.

In this embodiment, the thermocouples 24a, 24b and 24c connected to the dummy wafers DWa, DWb and DWc are used to obtain the temperature control data required for uniformly temperature-controlling the surface areas of the semiconductor wafers received in the processing chamber 14. Nonetheless, if such accurate data is not required, the thermocouples 24a, 24b and 24c need not be used to detect the temperatures of the dummy wafers DWa, DWb and DWc. In this case, it suffices to use only the inside thermocouples 19a, 19b and 19c, and to apply the time difference of the upper, central and lower heating zones of the in the reactor tube 4 as temperature control data.

After the temperature control data has been acquired and stored into the time difference table memory 23, thermal process on semiconductor wafers is started. First, the shutters 27 and 28 are closed, whereby the air inlets 8 and the exhaust outlet 11 are closed. The elevator mechanism 7 is driven to move the wafer boat 6 upwards in the reactor tube 4. The semiconductor wafers W to be processed, which are contained in the boat 6, are thereby inserted into the reactor tube 4. Then, the temperature controller 21 is set into thermal process mode and starts driving the heater power source 20 in accordance with the time difference table stored in the memory 23. The heaters 5a, 5b and 5c are thereby driven at such timing as shown in FIG. 3A or 3B.

Figure 3A:
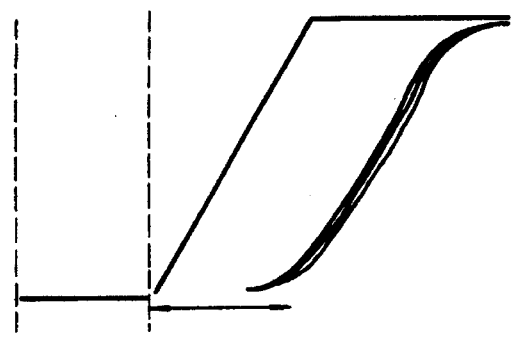
FIGS. 3A and 3B are graphs for explaining how to reduce the difference in temperature-increasing time in the first embodiment of the invention.

In the first temperature control scheme shown in FIG. 3A, the ramp signal generator 42 incorporated in the controller 21 generates ramp signals based on the time difference table stored in the memory 23. More specifically, if the temperature in any heating zone of the processing chamber 14 rises but at a lower rate than in the other heating zone, the ramp signal generator 42 generates a ramp signal for driving the heater provided in that heating zone earlier by the time difference thereof so that the temperatures in all heating zones may become equal. The ramp signal is supplied to the PID controller 43 and hence to the heater power source 20. In accordance with the ramp signals, each being a signal which has been corrected in terms of time difference, the heater power source 20 drives the heaters 5a, 5b and 5c. In other words, Feed-forward control is performed on the heaters 5a, 5b and 5c, whereby the temperature in the processing chamber 14 is distributed uniformly. As a result, the semiconductor wafers W can be heated or cooled to the same target temperature, despite the different thermal transfer characteristics and different thermal loss characteristics of the heating zones.

Figure 3B:

In a modification of the invention as shown in FIG. 3B, the temperature control scheme may measure not only the temperature increasing time difference among the heaters 5a, 5b and 5c, but also the time difference between a period required to increase the temperature in each zone to a value optimal for thermal processing and a period required to increase the temperature in the zone to said at least one reference value, and correcting the timing of starting heating of the zones so as to cancel the difference measured, and supply the signal representing the corrected time to the PID controller 43, so that the heaters 5a, 5b and 5c can be driven so superpose the temperature increasing curves of the heaters 5a, 5b and 5c on the optimum temperature increasing curve. In other words, by the above double feed-forward control the all heaters 5a, 5b and 5c can be driven so that the temperatures in the upper, central and lower heating zones increase equally early, to the temperature set for optimal thermal process. To be more specific, the process controller 41 calculates the difference between the time at which the temperature in one of the heating zones which is temperature-increased earliest must reach the optimum set temperature and the time the temperature in each heating zone reaches the actual set temperature and the temperature increasing differences among the heating zones and supplies the set temperature data to the tamp signal generator 42. The ramp signal generator 42 generates three ramp signals for driving the heaters 5a, 5b and 5c, i.e., signals corrected in terms of time difference, which are supplied to the PID controller 43. The PID controller 43 processes the ramp signals, thereby adjusting the timings of driving the heaters 5a, 5b and 5c. The ramp signals, thus processed, are supplied to the heater power source 20. Feed-forward control is thereby effected on the heaters 5a, 5b and 5c, whereby the temperature in the processing chamber 14 is distributed uniformly. As a result, the semiconductor wafers W can be heated or cooled to the same target temperature and thermally processed under optimal conditions.

Alternatively, the heaters provided for the heating zones in which temperature rises faster than in any heating zone may be driven later, such that the temperatures in all heating zones reach the target value at the same time.

Thereafter, while maintaining the semiconductor wafers W at the target temperature, a predetermined reactive gas, such as oxygen, is introduced into the reactor tube 4 through the reactive gas supply pipe 13. The reactive gas is applied onto the surface of each semiconductor wafer W for a predetermined period of time, forming an oxide film thereon. Next, the air-supply fan 10 and the exhaust fan 12 are rotated, thereby cooling the interior of the processing chamber 14. During the cooling operation, too, the heaters 5a, 5b and 5c are turned off at timings adjusted based on the time difference table stored in the memory 23. The time differences of the upper, central and lower heating zones are thereby canceled out. Hence, the semiconductor wafers W can thereby cooled to the same temperature.

During the cooling operation, the temperatures of the inside thermocouples 19a, 19b and 19c are detected, and the temperature controller 21 controls the rotational speeds of the fans 10 and 12 in accordance with the temperatures of the thermocouples 19a, 19b and 19c, so that the temperature in the processing chamber 14 is lowered at a desirable speed. At the same time, a purge gas is introduced into the reactor tube 4, thereby expelling the residual reactive gas from the chamber 14. After the temperature in the reactor tube 4, i.e., the chamber 14, has fallen to, for example, room temperature, the air-supply fan 10 and the exhaust fan 12 are stopped. Next, the elevator mechanism 7 is driven, moving the wafer boat 6 downwards. The semiconductor wafers W, thermally processed, are removed from the tubular furnace 2.

In the first embodiment, the heater 5 consists of three heaters 5a, 5b and 5c which are arranged in the same direction as the wafers W are arranged in the reactor tube 4, the thermocouples 19a, 22a and 24a are provided for detecting the temperature in the upper heating zone, the thermocouples 19b, 22b and 24b are used for detecting the temperature in the central heating zone, and the thermocouples 19 cm 22c and 24c are provided for detecting the temperature in the lower heating zone. Nevertheless, the present invention is limited to the first embodiment. The heater 5 may consists of two heaters or four or more heaters.

As described above, in the temperature control method according to the first embodiment of the invention, the timings of driving the heaters provided for the heating zones of the processing chamber, respectively, are adjusted so as to increase or decrease the temperatures in these zones to the same value at the same time, whereby the temperature is distributed uniformly in the entire processing chamber despite the different thermal transfer characteristics and different thermal loss characteristics of the heating zones. Furthermore, this particular temperature control can be accomplished by a single temperature controller, which serves to simplify the system which performs the temperature control method.

Another temperature control method, which is the second embodiment of the invention, will be described which is applied to the vertical, high-speed thermal processing furnace shown in FIG. 6 which is designed to form an oxide film on each of semiconductor wafers.

As shown in FIG. 6, the vertical thermal processing furnace comprises a base 51, a tubular furnace 52, a reactor tube 54, a heater 55, a wafer boat 56, and an elevator mechanism 57. The base 51 is fixed horizontally. The furnace 52, which has an thermally insulated top, is mounted on the base 51 and extends vertically. The reactor tube 54 is located in the tubular furnace 52, with an annular space 53 provided between it and the inner circumferential surface of the furnace 52. The reactor tube 54 has a top made of, for example, silica. The heater 55 is, for example, a helical, resistive heat-generating member which is mounted on the inner circumferential surface of the furnace 52. The wafer boat 56 is made of, for example, silica, and can support a number of semiconductor wafers W, horizontally positioned and arranged one above another. The elevator mechanism 57 is used to move the wafer boat 56 up and down in the reactor tube 54.

At the bottom of the tubular furnace 52 there are provided air inlets 58 which communicates with the annular space 53. The ports 58 are connected to a manifold 59, which in turn is connected to an air-supply fan 60. When driven, the fan 60 supplies cooling air into the annular space 53 through the manifold 59 and the air inlets 58. The top of the furnace 52 has an exhaust outlet 61 which communicates with the annular space 53 to draw air from the annular space 53.

In the reactor tube 54, a reactive gas supply pipe 62 extends upwards from the bottom of the reactor tube 54. The pipe 62 is connected at its lower end to a gas source by a flow control device (not shown). A specific reactive gas can be supplied through the pipe 62 into the processing chamber 63 which is defined by the reactor tube 54. An exhaust pipe 64 is connected at one end to the bottom of the reactor tube 54 and at the other end to a vacuum pump (not shown). The chamber 63 can therefore be evacuated to a prescribed pressure, and the reactive gas can be drawn out of the processing chamber 63.

The wafer boat 56 has wafer-holding members 56a, a heat insulating cylinder 65 located below the members 56a, and a cover 66 connected to the lower end of the cylinder 65. When the wafer boat 56 is moved upwards by the elevator mechanism 57, the cover 66 closes the lower end of the reactor tube 54 in airtight fashion. Once the cover 66 has closed the lower end of the reactor tube 54, the processing chamber 63 can be evacuated by using the exhaust pipe 64 and the vacuum pump in preparation for thermal process. As the chamber 63 is thus evacuated, the reactive gas can be introduced into the chamber 63 through the reactive gas supply pipe 62.

The temperature control system of the vertical thermal processing furnace shown in FIG. 6 will be described.

As shown in FIG. 6, the system comprises an upper heater 55a, a central heater 55b, a lower heater 55c, temperature sensors 67a, 67b and 67c, and a temperature controller 68. The heaters 55a, 55b and 55c constitute the heater 55, e.g. a helical, resistive heat-generating member. The temperature sensors 67a, 67b and 67c, each comprising, for example, a thermocouple, are inserted in the wall of the tubular furnace 52 and located near the heaters 55a, 55b and 55c, respectively. Therefore, they are located outside the reactor tube 54. Temperature sensors need not be provided in the reactor tube 54 as in the conventional temperature method.

In the second embodiment, three temperature sensors 67a, 67b and 67c are provided near the heaters 55a, 55b and 55c and outside the reactor tube 54, for detecting the temperature in the upper heating zone of the processing chamber 63. Nevertheless, more or less temperature sensors may be located at different positions. Only one temperature sensor may suffice in the case where the temperature in the heating zones of the chamber 63 are not controlled independently of one another. If necessary, temperature sensors may be provided in the reactor tube 54, in addition to the sensors 67a, 67b and 67c located outside the tube 54, for the purpose of obtaining, for example, parameters of a correction signal.

In operation, the temperature sensors 67a, 67b and 67c generate temperature signals representing the temperatures they have detected. The temperature signals are supplied to the temperature controller 68. The controller 68 processes these signals in accordance with a temperature setting recipe corrected as will be described later, thereby generating control signals. Some of the control signals are supplied to a heater power source 69. Driven by these control signals, the heater power source 69 supplies power to the heaters 55a, 55b and 55c, thereby to control the output of the heaters. Another control signal is supplied to an inverter 70. In accordance with this control signal the inverter 70 changes the frequency of a drive signal for driving the air-supply fan 60. The rotational speed of the fan 60 is thereby controlled.

Instead of one heater power source 69, three heater power sources may be used to control the temperatures in the three heating zones with higher efficiency. In addition to the fan 60 and the inverter 70, an exhaust fan and another inverter for controlling the rotational speed of the exhaust fan may be provided to enhance the efficiency of cooling the tubular furnace 52.

With reference to FIGS. 7 to 11 it will now be explained how the high-speed thermal processing furnace described above performs the temperature control method according to the second embodiment.

FIG. 7 represents the waveform of a feed-forward (FF) signal used in the second embodiment. As can be understood from FIG. 7, the feed-forward (FF) signal is one approximated by the following exponential function f(t):

$$f(t)=E^* \exp(-t/T) \qquad (1)$$

where E is the maximum temperature fluctuation and T is the time constant.

As far as the inventors thereof know, the temperature transfer function in the chamber (63) and the temperature transfer function outside the chamber (63) can be approximated to each other in a primary delay system. Hence, the feed-forward signal can serve to enhance the response of temperature control since it is a signal approximated by the above-mentioned exponential function f(t).

How to combine a set temperature signal and a feed-forward signal, thereby to generate a composite temperature signal will be explained, with reference to FIG. 8. If a ramp signal A for raising the temperature in the processing chamber 63 from 500° C. to 1000° C. is input to the temperature controller 68, without being processed at all, the temperature in the chamber 63 can be controlled but slowly. This is inevitably because the heat transfer from the exterior of the chamber 63 to the interior thereof is delayed. The temperature in the chamber 63 cannot be increased as fast as is indicated by the ramp signal A.

To solve this problem, a feed-forward signal B shown in FIG. 8 is combined with the ramp signal A, thereby generating a composite temperature signal C. The composite temperature signal C is input to the temperature controller 68. In this case, the output of the heater 55 is increased by the feed-forward component of the signal C, which has been primarily determined by the time constant T and the maximum temperature fluctuation E. In other words, the control of the temperature in the chamber 63 can be achieved faster by the feed-forward component of the composite temperature signal C.

The maximum temperature fluctuation E and the time constant T, from which the feed-forward signal f(t) is generated, can be obtained by experiment or simulation. The feed-forward signal B may be combined with the ramp signal A when the temperature in the processing chamber 63 falls as the wafer boat 56 is inserted into the chamber 63 or when the duration of the ramp signal expires, thereby accomplishing feed-forward control on the temperature set for the chamber 63.

To control the temperatures in the individual heating zones, one same feed-forward signal B may be added to ramp signals A1, A2, and so on, or feed-signals B1, B2, and so on may be added to ramp signals A1, A2, and so on, respectively, thereby to obtain optimal conditions for controlling the temperatures in the heating zones.

FIG. 9 is a block diagram showing the temperature control system which performs the temperature control method according to the second embodiment. As shown in FIG. 9, a set temperature signal generator 81 generates a set temperature signal A representing a desired temperature. The signal A is supplied to a signal composing circuit 83. Meanwhile, an FF signal generator 82 generates an FF signal B in accordance with the equation (1). The feed-forward signal is input to the signal composing circuit 83. The circuit 83 combines the set temperature signal A and the FF signal B, generating a composite temperature signal C shown in FIG. 10. The timing of generating the FF signal B and the value for the set temperature can be designated beforehand in the recipe stored in a process controller (not shown). The maximum temperature fluctuation E and the time constant T, both required to generate the FF signal, can be stored in, for example, the FF signal generator 82 in the form of one or more data patterns. The FF signal generator 82 may be a part of the temperature controller 84, a part of the process controller, or an independent device.

FIG. 11 shows the results of the temperature control method according to the second embodiment and those of a conventional temperature control method.

As shown in FIG. 11, in the conventional method, the outer temperature TB is ramped up to the target value of, for example, 700+e,cir +ee Q!n+e,cir +ee w, while controlled not to rise over the target value, and the inner temperature tb gradually approaches the target value. That is, the inner temperature tb increases in slow control response.

By contrast, in the second embodiment of the invention, the outer temperature TA rises above the target value, and the inner temperature ta reaches the target value. That is, the inner temperature ta increases in fast control response. Thus, the method of the present invention can improve the control response, merely by monitoring the temperatures detected by the temperature sensors located outside the reactor tube, provided that a correction signal easily generated is added to the set temperature signal.

It will be explained how the second embodiment of the invention controls the temperature in the processing chamber of the vertical thermal processing furnace shown in FIG. 6 while thermal process is being performed in the chamber to form an oxide film on semiconductor wafers.

First, the shutters 71 and 72 are closed, whereby the air inlets 59 and the exhaust outlet 61 are closed. The elevator mechanism 57 is driven, moving the wafer boat 56 upwards in the reactor tube 54. The semiconductor wafers W to be processed, which are contained in the boat 56, are thereby inserted into the reactor tube 54. Then, the heaters 55a, 55b and 55c are turned on, raising the temperature in the processing chamber 63 to a target value of, for example, 1000°. The temperature in the chamber 63 fast rises to the target value. This is because, the output of each heater is overshot since the heater is driven by a composite temperature signal, i.e., a combination of a set temperature signal and an FF signal.

Thereafter, while maintaining the semiconductor wafers W at the target temperature, a predetermined reactive gas, such as oxygen, is introduced into the reactor tube 54 through the reactive gas supply pipe 62. The reactive gas is applied onto the surface of each semiconductor wafer W, forming an oxide film thereon. Next, the shutters 71 and 72 are opened, and the air-supply fan 60 is driven, applying cooling air into the space 53 between the tubular furnace 52 and the reactor tube 54. When the temperature in the chamber 63 falls to a predetermined value, the elevator mechanism 57 is driven, moving the wafer boat 56. The semiconductor wafers W, thermally processed, are removed from the tubular furnace 52. The thermal process is thereby completed.

In the second embodiment, an FF signal is added to a ramp-up signal, i.e., a heating signal, forming a composite signal. Instead, an FF signal may be added to a ramp-down signal, i.e., a cooling signal, thereby generating a composite signal. This composite signal, namely a combination of the FF signal and the ramp-down signal, can be supplied to the inverter 70, which can change the frequency of a drive signal for driving the air-supply fan 60. Therefore, the temperature in the processing chamber 63 can be decreased in fast control response. In this case, the maximum temperature fluctuation, used for generating the FF signal, assumes a negative value, not a positive value as in the case where the FF signal is added to a ramp-up signal (a heating signal).

The control method according to the second embodiment can optimally increase and decrease the temperature in the processing chamber, by selecting an appropriate value, either positive or negative, for the maximum temperature fluctuation over a broad range.

As indicated above, in the temperature control method according to the second embodiment, an FF signal generated from only two parameters is added to a signal representing a target temperature, forming a composite signal, and the composite signal is applied to raise the outer temperature above the target temperature. Therefore, the inner temperature can be controlled within a shorter time than by the conventional temperature control method. To control the inner temperature fast, it suffices to control the heaters until the temperatures detected by the sensors provided outside the chamber become equal to the temperature represented by the composite temperature signal. Without temperature sensors provided in the chamber, the method can control the temperature in the chamber both fast and accurately.

Still another temperature control method according to the third embodiment of the invention will be described which is applied to the vertical, high-speed thermal processing furnace shown in FIG. 6, with reference to FIGS. 12 to 14.

The third embodiment uses a feed-forward signal (FF) which has a waveform identical to that shown in FIG. 7. The FF signal is a signal approximated by the above-mentioned exponential function f(t) of the equation (1). In the third embodiment, however, E in the equation (1) represents a maximum amplitude control variable. The variable E can be power, voltage, current or frequency of a value appropriate for diving components which achieve temperature control.

With reference to FIG. 12, it will be explained how an FF signal and a controller control variable are combined into a composite variable. In order to raise the temperature in the processing chamber 63 from 500° C. to 1000° C., for example, it is necessary to supply a step signal A' (FIG. 12) to the heater power source 69. If the step signal A' is used, without being processed, to drive the heaters 55a, 55b and 55c, the temperature in the chamber 63 will not be raised to the set value as fast as desired; it will be raised but in slow control response. To achieve fast control response, a feed-forward (FF) signal B' (FIG. 12) is added to the step signal A', thereby obtaining a composite variable signal C'. When the heaters 55a, 55b and 55c are driven in accordance with the composite variable signal C', the output of each heater is increased by the FF signal, which has been primarily determined by a time constant T and a maximum amplitude control variable E. In other words, the control of the temperature in the chamber 63 can be achieved faster by the feed-forward component of the composite control variable C'.

The maximum amplitude control variable E and the time constant T, from which the feed-forward signal f(t) is generated, can be obtained by experiment or simulation.

The FF signal B' may be added to the step signal A' before the step signal A' reaches a high level, when the signal A' reaches the high level, or after the signal A' has reached the high level, thereby accomplishing feed-forward control on the temperature set for the processing chamber 63.

To control the temperatures in the individual heating zones, one same feed-forward signal B' may be added to step signals A1', A1', and son on, or feed-signals B1', B2', and so on may be added to step signals A1, A2, and so on, respectively, thereby to obtain optimal conditions for controlling the temperatures in the heating zones.

FIG. 13 is a block diagram of the temperature control system for performing the temperature control method according to the third embodiment. In this system, a set temperature signal generator 91 generates a signal representing a desired set temperature. This signal is input to a temperature controller 92, which generates a drive signal for determining a control variable of a power control device 93. The drive signal is supplied to a signal-composing circuit 95 together with the FF signal from a FF signal generator 94. The composing circuit 95 combines the FF signal with the drive signal, generating a composite dive signal. The composite drive signal, thus generated, is supplied to the power control device 93. The device 93 adjusts the output of a heater 96 in accordance with the composite drive signal. The heating temperature of the heater 96 is detected by a temperature sensor 97 provided outside the processing chamber 63 of the thermal processing furnace (FIG. 6). The temperature detected by the sensor 97 is fed back to the temperature controller 92. The controller 92 generates again a drive signal to increase the heating temperature to the set temperature represented by the signal output from the set temperature signal generator 91. The new drive signal is supplied to the signal-composing circuit 95 to be combined with the FF signal. When the heating temperature coincides with the set temperature, the temperature controller 92 generates no drive signal.

In the method according to the third embodiment, as described above, the signal-composing circuit 95 is connected to the output of the temperature controller 92 and combines the FF signal with the drive signal, generating a composite dive signal. Hence, the FF signal, if erroneous, is corrected in accordance with the temperature detected by the sensor 97 and fed back to the temperature controller 92. Therefore, the temperature control system shown in FIG. 13 operates as a fail-safe unit which prevents damage to the members being thermally processed.

The timing of generating the FF signal B' and the value for the set temperature can be designated beforehand in the recipe stored in a process controller (as shown in FIG. 4). The maximum amplitude control variable E and the time constant T, both required to generate the FF signal B', can be stored in, for example, the FF signal generator 94 in the form of one or more data patterns. The FF signal generator 94 may be a part of the power control device 93, a part of the process controller, or an independent device. The signal-composing circuit 95 may be a part of the temperature controller 92, a part of the power control device 93, or an independent device.

FIG. 14 shows the results of the temperature control method according to the third embodiment and those of a conventional temperature control method.

As evident from FIG. 14, in the conventional method, the outer temperature TB is ramped up to the target value of, for example, 700+e,cir +ee Q!n+e,cir +ee W, while controlled not to rise over the target value, and the inner temperature tb gradually approaches the target value.

In the third embodiment of the invention, the outer temperature TA rises above the target value, and the inner temperature ta reaches the target value. That is, the inner temperature ta increases in fast control response. Thus, the method of the present invention can enhance the control response, merely by monitoring the temperatures detected by the temperature sensors located outside the reactor tube, provided that a correction signal easily generated is added to the set temperature signal.

It will be explained how the third embodiment controls the temperature in the processing chamber of the vertical thermal processing furnace shown in FIG. 6 while thermal process is being performed in the chamber to form an oxide film on semiconductor wafers.

First, the shutters 71 and 72 are closed, whereby the air inlets 59 and the exhaust outlet 61 are closed. The elevator mechanism 57 is driven, moving the wafer boat 56 upwards in the reactor tube 54. The semiconductor wafers W to be processed, which are contained in the boat 56, are thereby inserted into the reactor tube 54. Next, the heaters 55a, 55b and 55c are turned on, raising the temperature in the processing chamber 63 to a target value of, for example, 1000°. The temperature in the chamber 63 fast rises to the target value. This is because, the output of each heater is overshot since the heater is driven by a composite drive signal, i.e., a combination of a drive signal and an FF signal. The temperatures detected by the outer temperature sensors 67a, 67b and 67c are fed back to the temperature controller 92 which is connected to the input of the signal-composing circuit 95. The FF signal can therefore be corrected if erroneous.

Thereafter, while maintaining the semiconductor wafers W at the target temperature, a predetermined reactive gas, such as oxygen, is introduced into the reactor tube 54 through the reactive gas supply pipe 62. The reactive gas is applied onto the surface of each semiconductor wafer W, forming an oxide film thereon. Next, the shutters 71 and 72 are opened, and the air-supply fan 60 is driven, applying cooling air into the space 53 between the tubular furnace 52 and the reactor tube 54. When the temperature in the processing chamber 63 falls to a predetermined value, the elevator mechanism 57 is driven, moving the wafer boat 56. The semiconductor wafers W, thermally processed, are removed from the tubular furnace 52. The thermal process is thereby completed.

In the third embodiment, an FF signal for driving the heaters is added to a step signal, forming a composite signal.

Instead, an FF signal may be added to a step signal for driving a cooling device. More specifically, the FF signal may be combined with a ramp-down signal which is to be supplied to the inverter 70, so that the inverter 70 may change the frequency of the drive signal for driving the air-supply fan 60. In this case, the temperature in the chamber 63 can be decreased in fast control response. In the third embodiment, the maximum amplitude of the FF signal can take an appropriate value, either positive or negative, over a broad range.

As explained above, in the temperature control method according to the third embodiment, an FF signal generated from only two parameters is combined with a drive signal for determining a control variable by which a temperature controller is driven so as to reach the temperature in the chamber at a desired set value, to obtain a composite signal. Since the outer temperature of the processing chamber is overshot once by the composite signal, the inner temperature can be controlled within a shorter time than by the conventional temperature control method. To control the inner temperature fast, it suffices to control the heaters until the temperatures detected by the sensors provided outside the chamber become equal to the target temperature in the processing chamber. Without temperature sensors provided in the chamber, the method can control the temperature in the chamber both fast and accurately. Furthermore, since the FF signal, if erroneous, are corrected in accordance with the temperature detected by the sensor 97 and then fed back to the temperature controller 92, the temperature control system shown in FIG. 13 operates as a fail-safe unit.

Another temperature control method according to the fourth embodiment of the invention will be described with reference to FIG. 15.

The fourth embodiment is a combination of the first embodiment and the second or third embodiment. In the fourth embodiment, the FF signal generated in the second or third embodiment is added to the ramp signal obtained in the first embodiment, which is shown in FIG. 3A or FIG. 3B, thereby generating a composite signal, and the composite signal thus generated controls a heater power source.

FIG. 15 illustrates the temperature control system for performing the method according to the fourth embodiment. As shown in FIG. 15, a signal-composing circuit 83 has two inputs connected a ramp signal generator 42 and an FF signal generator 82, respectively. The output of the circuit 83 is connected to a PID controller 43. The circuit 83 combines a ramp signal and an FF signal supplied from the generator 42 and the PID controller 43, thus generating a composite signal. The composite signal is input to the PID controller 43, which controls a heater power source 20. Therefore, the fourth embodiment achieves both the advantage of the first embodiment and the advantage of the second or third embodiment. To be more specific, the timings of driving the heaters provided for the heating zones of the processing chamber are adjusted so as to cancel the temperature increasing or decreasing time differences the zones have because of their different thermal loss characteristics. Hence, the method according to the fourth embodiment can perform increase and decrease uniformly the temperature in the processing chamber of a thermal processing furnace, in faster control response than in the conventional temperature control method.

The first to fourth embodiments described above are designed for use in a vertical furnace for performing thermal process on semiconductor wafers. Nonetheless, the present invention can be applied to temperature control in equipment which performs thermal process on glass substrates, LDC substrates, and the like.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for controlling temperature in a thermal processing equipment having a vertical processing furnace, comprising the steps of:

providing a plurality of heaters in a respective plurality of vertical zones of said vertical processing furnace;

heating the plurality of zones of the processing furnace by the plurality of heaters provided in said processing furnace which contains materials to be processed;

measuring respective temperatures in said zones;

measuring respective periods of time which elapse until the respective temperatures in said zones increase from a predetermined value to at least one reference value;

obtaining time differences among the periods measured;

storing the time differences in memory means; and energizing the plurality of heaters, respectively, at timing sequences corresponding to the stored time differences to raise the respective temperatures of the zones to the reference value at substantially a same time.

2. The method according to claim 1, wherein said energizing step includes driving those of said plurality of heaters which correspond to zones in which temperature increases slowly using at least one of the timing sequences, earlier in time based on the stored time differences than a remaining one of said plurality of heaters which corresponds to a remaining one of the zones in which temperature increases most quickly to reach the reference value.

3. The method according to claim 1, wherein said measuring respective periods step includes:

measuring a difference between a preset time period required to increase the temperature in each of the zones to the reference value optimal for thermal processing and an actual time period required to increase the temperature in each of the zones to said reference value; and correcting a starting time for heating of the respective zones so as to cancel the measured difference.

4. The method according to claim 1, wherein said energizing step comprises:

measuring periods of time which elapse until temperatures in said zones increase from 500° C. to at least one of the reference values of 750° C., 1000° C. and 1200° C.;

obtaining time differences among the periods measured; and storing a table of the time differences in the memory means.

5. A method for controlling temperature in a thermal processing equipment having a vertical processing furnace, comprising the steps of:

generating a plurality of first signals for independently controlling a plurality of heaters provided in a respective plurality of zones of the vertical processing furnace containing members to be processed, such that each heater increases the temperatures in the respective zone of the vertical processing furnace to a predetermined set value;

measuring respective temperatures in said zones;

generating at least one second signal for compensating for a delay of thermal transfer from exterior of the processing furnace to interior thereof;

combining the first signal and the second signal, thereby generating a composite signal; and driving said plurality of heaters in accordance with the composite signal, thereby to compensate for the delay of thermal transfer.

6. The method according to claim 5, wherein said generating at least once second signal step comprises generating, as the second signal, a feed-forward signal approximated by a function f(t), where $$f(t)=E^* \exp(-t/T)$$

where E is a maximum temperature fluctuation and T is a time constant, and said combining step comprises combining the first signal and the feed-forward signal directly.

7. The method according to claim 5, further comprising:

converting the first signal to a control variable; and wherein said generating at least one second signal step comprises generating, as the second signal, a feed-forward signal approximated by a function f(t), where $$f(t)=E^* \exp(-t/T)$$

where E is a maximum control variable and T is a time constant, and said combining step comprising combining the control variable and the feed-forward signal.

8. The method according to claim 5, wherein:

said generating a plurality of first signals step comprises generating a plurality of first signals corresponding to respective of the zones, said generating at least one second signal step comprises generating a plurality of second signals corresponding to the zones, respectively, said combining step comprises combining respective of the first signals and the second signals, thereby generating a plurality of composite signals, and said driving step comprises driving said heaters by respective of the composite signals.

9. A method for controlling temperature in thermal processing equipment having a vertical processing furnace, comprising the steps of:

generating a plurality of first signals for driving respective of a plurality of heaters provided in respective of a plurality of vertical zones of the processing furnace containing members to be processed, such that said heaters increase the temperatures in the respective zones of the processing furnace to a predetermined set value;

measuring temperatures in each of the zones;

generating at least one second signal compensating for a delay of thermal transfer from an exterior of the processing furnace to an interior thereof;

combining the first signals, and the second signal, thereby generating a plurality of composite signals;

driving said heaters provided in respective of said zones by respective of the composite signals, thereby to compensate for the delay of thermal transfer;

measuring periods of time which elapse until temperatures in said zones increase from a predetermined value to at least one reference value;

obtaining time differences among the periods measured; storing the time differences in memory means; and said driving step further comprises driving said heaters at respective timing sequences corresponding to the stored time differences so to raise the respective temperatures of each zone to the reference value at substantially a same time.

10. The method according to claim 9, wherein said driving step comprising driving some of said heaters which correspond to some of the zones in which temperature increases slowly, using at least one of the timing sequences earlier in time by the stored time differences than a remaining one of said heaters which corresponds to a remaining one of the zones in which the temperature increases most quickly to reach the desired value.

11. The method according to claim 9, wherein said measuring step comprises:

measuring a difference between a preset period required to increase the temperature in each of the zones to the reference value optimal for thermal processing and an actual period required to increase the temperature in each of the zones to said reference value, and correcting the time difference so as to cancel out the difference measured.

12. The method according to claim 9, wherein:

said generating at least one second signal step comprises generating, as the second signal, a feed-forward signal approximated by a function f(t), where $$f(t)=E^* \exp(-t/T)$$

where E is a maximum temperature fluctuation and T is a time constant, and said combining step comprises combining the first signals and the feed-forward signal directly.

13. The method according to claim 9, further comprising:

converting each of the first signals to a control variable;

said generating at least one signal step comprising generating, as the second signal, a feed-forward signal approximated a function f(t), wherein $$f(t)=E * \exp(-t/T)$$

where E is a maximum control variable and T is a time constant; and said combining step comprising combining the control variable and the feed-forward signal.

14. The method according to claim 9, wherein:

said generating at least one second signal step comprises generating a plurality of signals corresponding to the zones, respectively; and said combining step comprises combining the first signals and the second signals, respectively, thereby generating a plurality of composite signals.

15. A temperature control apparatus for controlling a temperature in a vertical processing furnace containing materials to be processed and having a plurality of zones sectioned in a vertical direction, comprising:

a plurality of heaters provided in respective of said zones of said thermal processing furnace, respectively, for independently heating said zones;

at least one temperature sensor configured to measure temperatures in said zones;

time difference measuring means for measuring periods of time which elapse until temperatures in said zones increase from a predetermined value to at least one reference value, and obtaining time differences among the periods measured; and memory means for storing the time differences;

heater control means for independently driving the plurality of heaters at timing sequences corresponding to the measured time differences associated with raising the respective temperatures of the zones to the at least one reference value at substantially the same time.

16. The apparatus according to claim 15, wherein said heater control means includes means for driving some of said heaters which correspond to some of the zones in which the temperature increases slowly, using at least one of the timing sequences earlier in time based on the stored time differences than a remaining one of said plurality of heaters which corresponds to a remaining one of the zones in which the temperature increases most quickly to reach the reference value.

17. The apparatus according to claim 15, wherein:

said time difference measuring means measures a difference between a preset time period required to increase the temperature in each of the zones to the reference value optimal for thermal processing and an actual time period required to increase the temperature in each of the zones to said reference value, and corrects for the time difference so as to cancel out the difference measured.

18. A temperature control apparatus for controlling a temperature in a vertical thermal processing chamber containing members to be processed and having a plurality of zones sectioned in a vertical direction, comprising:

a plurality of heaters provided in respective of said plurality of zones of said vertical thermal processing chamber;

first signal generating means for generating a plurality of first signals for independently controlling said plurality of heaters, such that said plurality of heaters increase the temperatures in the zones of the thermal processing chamber to a predetermined set value;

at least one temperature sensor configured to measure temperatures in said zones;

second signal generating means for generating at least one second signal for compensating for a delay of thermal transfer from an exterior of the processing chamber to an interior thereof;

signal-composing means for combining the plurality of first signals and the second signal, to generate a plurality of composite signals; and control means for driving independently said plurality heaters in accordance with respective of the composite signals, to compensate for the delay of thermal transfer.

19. The apparatus according to claim 18, wherein:

said second signal generating means generates, as the second signal, a feed-forward signal approximated by a function f(t), wherein $$f(t) = E * \exp(-t/T)$$

where E is a maximum temperature fluctuation and T is a time constant; and said said signal-composing means combines the first signal and the feed-forward signal directly.

20. The apparatus according to claim 18, further comprising:

means for converting each of the first signals to a control variable and said second signal generating means generating, as the second signal, a feed-forward signal approximated by a function f(t), wherein $$f(t) = E * \exp(-t/T)$$

where E is a maximum control variable and T is a time constant; and said signal-composing means combining the control variable and the feed-forward signal.

21. The apparatus according to claim 18, wherein:

said second signal generating means generates a plurality of second signals corresponding to the zones, respectively;

said signal-composing means combines respective of the first signals and the second signals, to generate a plurality of composite signals; and said control means independently controls said heaters in accordance with respective of the composite signals.

22. A temperature control apparatus for controlling a temperature in a thermal processing chamber containing members to be processed and having a plurality of zones sectioned in a vertical direction, comprising:

a plurality of heaters provided in respective of said zones of said thermal processing chamber, respectively;

at least one temperature sensor configured to measure temperatures in respective of said zones;

first signal generating means for generating a plurality of first signals for independently controlling said heaters, such that said plurality of heaters increase the temperatures in the zones of the thermal processing chamber to a predetermined set value;

second signal generating means for generating at least one second signal for compensating for a delay of thermal transfer from an exterior of the processing chamber to an interior thereof;

signal-composing means for combining the first signals and the at least one second signal, to generate a plurality of composite signals;

control means for driving independently said heaters in accordance with the plurality of composite signals, thereby to compensate for the delay of thermal transfer;

time difference measuring means for measuring periods of time which elapse until temperatures in said zones increase from a predetermined value to at least one reference value, and obtaining time differences among the periods measured;

a memory configured to store the time differences obtained by said time difference measuring means; and heating control means for driving said heaters, respectively, at timing sequences corresponding to the measured time differences associated with raising the respective temperatures of the respective zones to the at least one reference value at substantially the same time.

* * * * *